H. M. NORRIS.
GEARING.
APPLICATION FILED DEC. 16, 1910.

1,024,220.

Patented Apr. 23, 1912.

Witnesses.
P. A. Carr.
James G. Carr

Henry M. Norris, Inventor,
By Robert S. Carr, Atty.

UNITED STATES PATENT OFFICE.

HENRY M. NORRIS, OF CINCINNATI, OHIO, ASSIGNOR TO THE CINCINNATI BICKFORD TOOL CO., OF CINCINNATI, OHIO, A CORPORATION OF OHIO.

GEARING.

1,024,220.  Specification of Letters Patent.  Patented Apr. 23, 1912.

Application filed December 16, 1910. Serial No. 597,715.

*To all whom it may concern:*

Be it known that I, HENRY M. NORRIS, a citizen of the United States, residing at Cincinnati, Ohio, have invented a new and useful Improvement in Gearing, of which the following is a specification.

My invention relates to gearing adapted to the use of radial drills or for other suitable purposes and the objects of my improvements are to provide means for changing the speed of a driven shaft from the constant speed of a driving shaft; to provide means for maintaining a minimum speed of the driven shaft as a basis from which the increased speeds thereof may be graduated instead of starting from zero for each different speed change; and to provide simple and durable construction and assemblage of the different members for securing facility of operation and efficiency of action. These objects are attained in the following described manner, as illustrated in the accompanying drawings, in which:—

Figure 1:
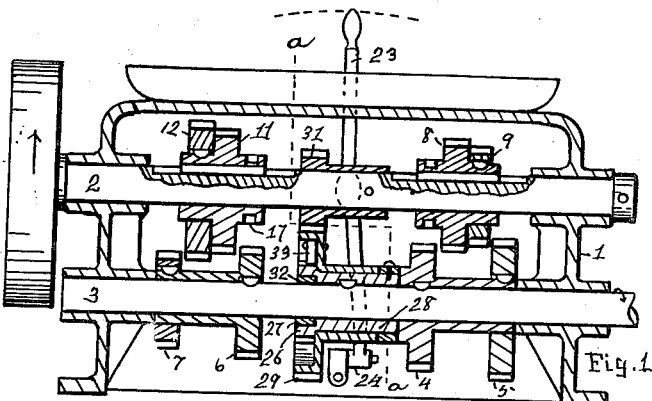
Figure 2:
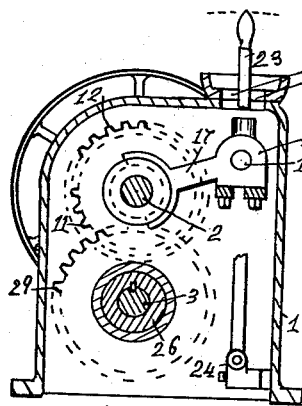
Figure 4:
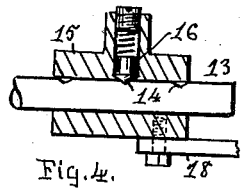
Figure 3:
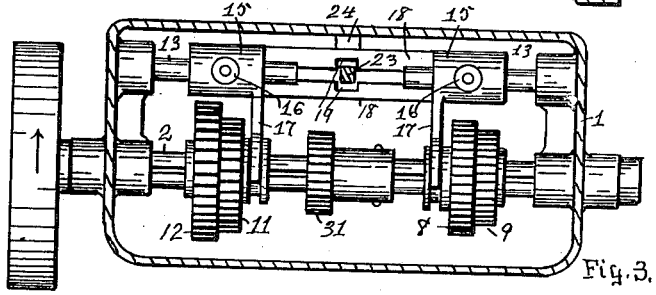
Figure 5:
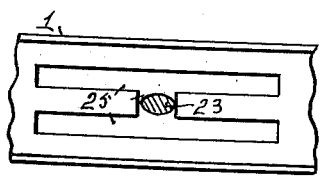
Figure 6:
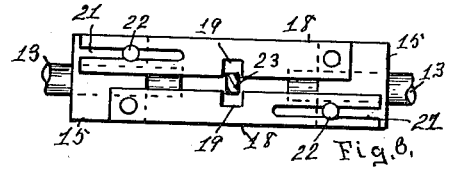
Figure 7:
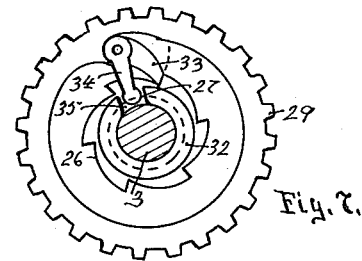

Figure 1 is a longitudinal vertical section of gearing embodying my improvements; Fig. 2 a transverse section on the line a—a of Fig. 1; Fig. 3 a plan with parts in section; Fig. 4 a longitudinal vertical section showing the detent pin in the yoke collar; Fig. 5 a plan of the guide slots for the operating lever; Fig. 6 an inverted plan showing the sliding link connections with the yoke collars, and Fig. 7 the silent pawl and ratchet for the slow speed gear.

In the drawings 1 represents the casing, 2 the driving shaft and 3 the driven shaft both journaled therein. Different sized gears 4, 5, 6, and 7 are secured on the driven shaft, and corresponding gears 8, 9, 11 and 12 adapted to be detachably engaged therewith are secured together in pairs and splined on the driving shaft.

Oppositely disposed studs 13 formed with concave seats 14 are secured in the casing parallel with the driving shaft. Similar sleeves 15 slidingly mounted on the corresponding studs are each provided with a spring actuated detent pin 16 adapted to automatically and yieldingly engage with the seats 14. Said sleeves are each also formed with a laterally projecting yoke arm 17 in movable engagement with an annular groove in the hubs of the respective gears 8 and 11 of each pair of gears on the driving shaft. Similar links 18 each formed with a central notch 19 and an open slot 21 in one end are secured at the other end to the corresponding sleeves 15. Cap screws 22 serve to slidably engage the slotted end of said links to the respective opposite sleeves.

A hand lever 23 secured at one end to the casing by means of a universal joint 24 and adapted to engage with the notch 19 in either of said links is extended through the H shaped slot 25 formed through the top of the casing.

A ratchet wheel 26 secured on the driven shaft is formed with a counter bore 27 and with an extended hub 28 whereon the large gear 29 is loosely mounted and in continuous engagement with small gear 31 secured on the driving shaft. A split ring 32 in frictional engagement with the driven shaft is located within the counter bore 27 of the ratchet wheel. A pawl 33 pivotally secured to the loose gear 29 and adapted to engage with the teeth of the ratchet wheel 26 is provided with a lug 34 which terminates within the slot or split 35 in the ring 32.

In operation, the pawl and ratchet wheel and gear connections with the driving shaft serve to prevent the decrease in speed of the driven shaft below a predetermined amount and also to permit its speed to be accelerated as desired. The engagement of the hand lever with the notch in either of the links permits it to be moved in the corresponding longitudinal portion of the H shaped slot for alternately engaging the corresponding gears 8 and 9 or 11 and 12 with the respective gears 4 and 5 or 6 and 7 whereby four graduations of accelerated speed may be imparted to the driven shaft. The automatic engagement of the detent pins with the seats in the studs serve to yieldingly maintain the sleeves with the sliding gears in predetermined adjusted positions.

Having fully described my improvement, what I claim as my invention and desire to secure by Letters Patent of the United States is:—

1. A gearing comprising, a shaft, gears splined thereon, oppositely disposed studs parallel with the shaft, sleeves slidably mounted thereon and formed with arms engaging with the respective gears, parallel links each formed with a central notch and secured to the respective sleeves, a lever for engaging with the notch in either link for moving the corresponding sleeve and gear longitudinally, and a stationary slotted member for maintaining the lever within the notch.

2. A gearing comprising a casing formed with parallel slots having a central passage between them, a shaft within the casing parallel with the slots, gears splined thereon, oppositely disposed studs projecting within the casing parallel with the shaft and the slots, sleeves slidable thereover, and each formed with an arm engaging with the respective gears, parallel links each formed with a central notch and secured to the respective sleeves, and a lever fulcrumed at a fixed point and movable in the slots and laterally through the passage for alternately engaging with the notch in the respective links for shifting the sleeves with the gears on the shaft.

H. M. NORRIS.

Witnesses:
 Henry G. Frech,
 R. S. Carr.